Oct. 19, 1965 M. A. FERGUSON 3,213,257
ELECTRICAL STOCK REMOVAL APPARATUS
Filed July 19, 1960
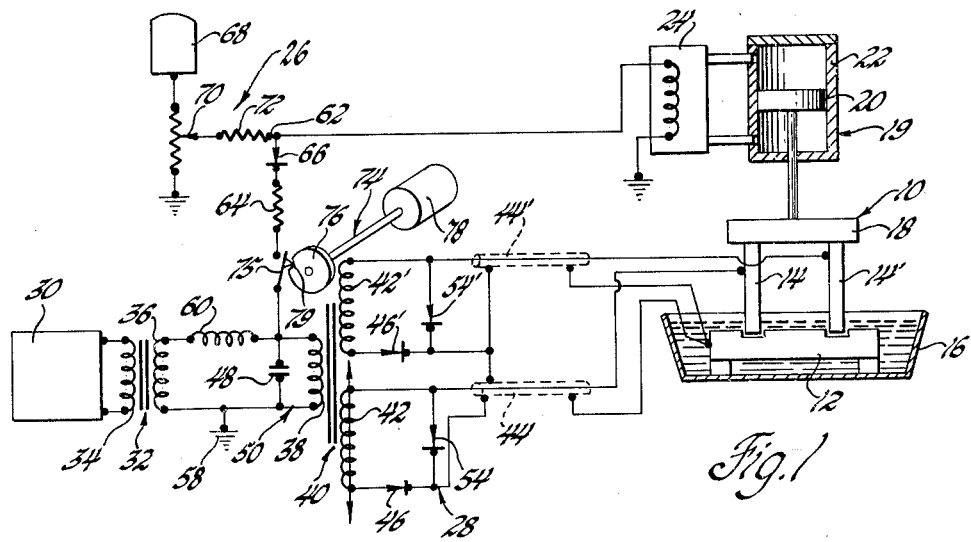
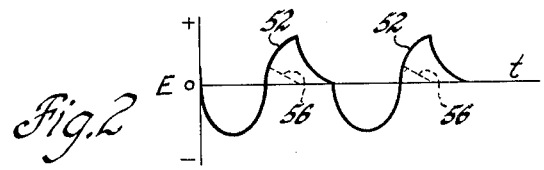
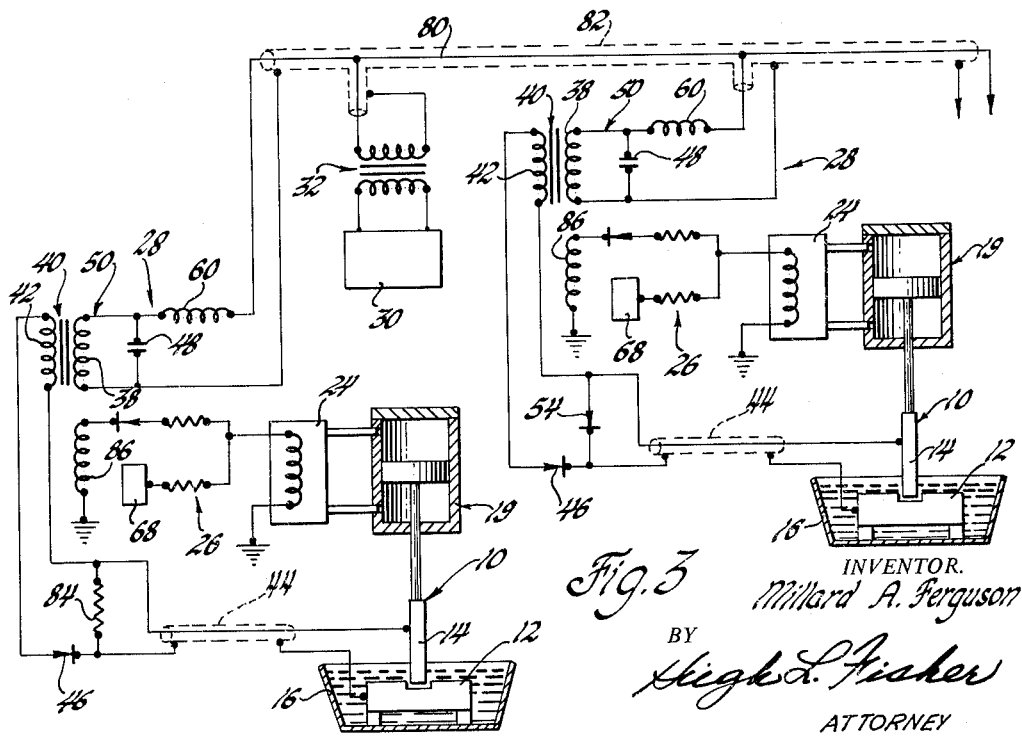
INVENTOR.
Millard A. Ferguson
BY
Hugh L. Fisher
ATTORNEY

United States Patent Office 3,213,257
Patented Oct. 19, 1965

3,213,257
ELECTRICAL STOCK REMOVAL APPARATUS
Millard A. Ferguson, Utica, Mich., assignor to General Motors Corporation, Detroit, Mich., a corporation of Delaware
Filed July 19, 1960, Ser. No. 43,805
49 Claims. (Cl. 219—69)

This invention relates to improvements in electrical stock removal apparatus.

Ideally, any stock removal process should afford maximum stock removal while at the same time providing the best possible finish. Actually, in any practical process, the maximum stock removal and fine finish objectives are not compatible, for maximum stock removal rates usually produce the roughest finish. This is particularly true with electrical stock removal apparatus, i.e., apparatus employed in the process known variously as electrical discharge machining, electro-erosion, spark machining, etc., or the process referred to as electro-chemical machining.

Considering the electrical discharge machining process as exemplary, the power supply frequently used is known in the art as an R.C. power supply and has a capacitance in parallel with a machining gap formed between a cutting tool electrode and a workpiece electrode. When the charge is sufficient to break down the gap, which is filled with a dielectric fluid, a stock removing discharge occurs. Obviously, the number of discharges across the gap and accordingly the stock removal rate will be dependent on the process itself, i.e., the conditions of the gap and the amount of capacitance employed, and not upon the power source. This makes it somewhat difficult to control finish as well as so-called overcut, which is the tendency for the apparatus to machine oversize.

Moreover, the discharge rate is somewhat limited by gap current oscillations during a discharge, which oscillations result in current flow in a reverse direction as well as in the desired forward direction. Therefore, the time needed to deionize the gap so as to stop current flow and permit capacitor recharging is increased. This in turn requires more machining time.

It is therefore an aim of the invention to provide a power supply that overcomes the foregoing disadvantages. The frequencies produced by the power supply incorporating the principles of the invention are not limited by the process but are determined by the source. Consequently, considerably higher frequencies are possible, the available equipment itself determining maximum frequency, and as a result, faster stock removal rates are attainable. Also, finish and overcut are more easily controlled and accordingly the number of discharges across the gap. Additionally, so as to facilitate fast stock removal rates, the invention makes provision for inhibiting current flow across the gap in the reverse direction thereby reducing the time required for the gap to deionize.

Whenever a high frequency power source is contemplated for use with electrical discharge machining apparatus, the capacity of the apparatus becomes a concern, for generally the apparatus is operated at less than the full capacity of the source. This is because a cutting tool electrode can only handle a certain amount of current. The maximum amount of current that the electrode can handle should always be available. Hence, there can be substantial power losses unless the apparatus is operated at or near unity power factor despite the varying and intermittent loads. Also, the proportion between the number of input pulses generated by the source and the actual discharges occurring across the gap is a factor, the optimum rate or proportion being that occurring when each input pulse produces a corresponding discharge across the gap. And, short circuits must be considered since they occur frequently, and they must not be permitted to damage the apparatus.

Accordingly, the invention seeks to provide a novel power supply in which source energy is stored so as to draw evenly from the source and also to permit considerably more energy to be supplied to the load than the source is separately capable. Further, the invention has provision for controlling short circuit currents so as to reduce the possibility of damage to the power source from an excessive short circuit current.

As has been mentioned, electrical stock removal apparatus is operated at less than the capacity of the power supply due to the inability of a cutting tool electrode to handle any substantial amount of current. For this reason, the invention provides a novel arrangement wherein separate apparatus may be supplied by a common source and/or one apparatus may have several cutting tools supplied by the same source.

Inasmuch as the voltage across the gap reflects the spacing between the workpiece and cutting tool electrodes, it is desirable to use this aspect to control gap spacing in accordance with the demands of a particular application of the apparatus. To achieve this, the invention affords a new and different system in which a control voltage corresponding to gap voltage is derived from the apparatus power supply and is utilized in a simple gap spacing control.

When machining debris does collect in the gap, and as a result, work damaging short circuits occur. Of coruse, this does increase machining time and produces erratic results. To overcome this problem, the invention provides for periodically separating the workpiece and cutting tool electrodes so as to both permit the gap to clear and to flush away the short producing debris.

The foregoing and other objects and advantages of the invention will be apparent from the following description and from the accompanying drawings in which:

FIGURE 1 is both a schematic and circuit diagram of one embodiment of the invention;

FIGURE 2 is a graph depicting the wave shapes of the gap discharges achieved with the invention, and FIGURE 3 is both a schematic and circuit diagram of another embodiment of the invention.

Referring now to the drawings in detail, and particularly to FIGURE 1, the electrical stock removal apparatus there depicted includes a basic cutting machine designated by the numeral 10. Associated with this machine 10 is a conductive workpiece 12 and a pair of conductive cutting tools 14 and 14', each insulated from the other and each functioning as an electrode with the workpiece 12 being the anode and the cutting tools 14 and 14' the cathodes (additional workpieces and cutting tools may be used if wanted). It should be kept in mind that these polarities are for demonstration purposes and should not be construed as a limitation, for if preferred, the polarities may be reversed, i.e., the workpiece 12 made negative, and the cutting tools 14 and 14' positive. The workpiece 12 is fixedly positioned within a container 16 to which is supplied in any appropriate way a suitable dielectric fluid. Preferably, the workpiece 12 is grounded along with the machine 10, but if desired, the workpiece 12 can be insulated from the container 16. Both of the cutting tools 14 and 14' are positioned within a holder 18 and are moved therewith by a fluid pressure operated motor shown generally at 19. Other provisions may be made for maneuvering the holder 18; however, fluid pressure is preferred because of the responsiveness. Or, if wanted, the workpiece 12 can be moved and the cutting tools 14 and 14' fixed.

In this instance, the motor 19 includes a piston 20 that is joined to the holder 18 and that is enclosed within a fluid tight cylinder 22. The supply of pressure fluid to the motor 19 is controlled by a force motor and servo valve assembly viewed generally at 24. This assembly 24 may be of any known type such as that shown and described in the U.S. application S.N. 832,345 to Colten et al., filed August 7, 1959, now Patent No. 3,059,150. The force motor and servo valve assembly 24, as will become more apparent, is operated by a gap spacing control denoted generally at 26 in accordance with a control voltage derived from a power supply designated generally by the numeral 28, this control voltage being reflective of the voltage across the gap between the workpiece 12 and the cutting tools 14 and 14'.

Considering next the power supply 28, a high frequency power source is shown by the block assigned the numeral 30. The source 30 preferably has a frequency output of 1 kc. or less to 30 kc. or more, which may be achieved electronically, as by an oscillator, or by a suitable alternator, e.g., a motor generator set. The source energy is supplied first to an input or isolating transformer 32 whose primary winding 34 is energized by the source and whose secondary winding 36 communicates with a primary winding 38 of an output transformer 40. A pair of secondary windings 42 and 42' of the output transformer 40 are connected respectively across the gaps between the workpiece 12 and the cutting tools 14 and 14'. Preferably, the connections across the gaps between the secondary windings 42 and 42' are made respectively through shields 44 and 44' so as to provide a minimum inductance path therebetween. This limits the inductance so as to have negligible effect upon the desired rapid pulsations across the gaps.

Since a unidirectional voltage is desired to be applied to the gaps, rectifiers 46 and 46' are incorporated in the circuits extending between the secondary windings 42 and 42' an the gaps between the workpiece 12 and the cutting tools 14 and 14'. With the polarities previously mentioned, this means that discharges across the gap only occur on the negative half cycles of the pulses supplied by the source 30. Hence, a pulsating direct current results, having a frequency equal to the source frequency.

If desired, full-wave rectification in any appropriate way may be employed so as to produce a freqeuncy twice that of the source. This doubles the cutting ability but with the same pulse amplitude, and therefore, offers an advantage. Also, in some applications, it may not be necessary to rectify the voltage, the A.C. voltage being acceptable.

In order to permit the voltage applied to the gap to be varied, one or both of the output transformer secondary windings 42 and 42' may be repositionable relative to the primary winding 38, thereby changing the coupling therebetween, or an adjustable tap of a known type may be employed for selecting the desired voltage to be taken from the two secondary windings 42 and 42'. This renders the apparatus more versatile permitting easy control for different types of cuts such as rough and fine finishes, and also permits adjustment for different materials.

In parallel with the output transformer primary winding 38 is a tuning capacitor 48 that together with the primary winding 38 provides a parallel resonant or tank circuit assigned the numeral 50. (If preferred, a separate inductive reactance other than that from primary winding 38 may be used for the tank circuit.) With this arrangement, energy from the source 30 is stored by the tank circuit 50 during the entire cycle of the source 30, thus enabling energy to be drawn evenly from the source 30 while permitting energy to be supplied to the gaps in half cycle bursts of far more energy than the source 30 would be capable of alone, this being due both to the "flywheel effect" of the tank circuit 50 and to the input transformer 32, which preferably, in this embodiment, steps up the voltage to the tank circuit 50.

Moreover, the tank circuit 50 is tuned to draw a leading current at no load. Since the electrical discharge machining load is highly inductive, the combined electrical discharge machining load and tank circuit load results in a nearly unity power factor, or resistive load to the source 30, thereby allowing the source 30 to operate at maximum efficiency. The capacitor 48 by providing power factor correction also permits the coupling between the primary 38 and secondaries 42 and 42' to be loose so as to facilitate in the isolation of short circuits from the source 30. In other words, power can be readily provided by the capacitor 48 at times when the source 30 can not.

Additionally, the input transformer 32 isolates the source 30 from ground thus protecting the operator of the machine 10 from shock hazard should he accidentally touch either of the leads from the source 30. And too, the input transformer 32 raises the voltage to a higher level for more efficient energy storage by the tank circuit 50. As with transformer 40, the ratio of the transformer 32 may also be made adjustable in any known way.

Further enhancing the efficiency of the apparatus displayed in FIGURE 1, is the inhibiting of the tendency for current to flow in a reverse direction across the gap. This reverse current not only rapidly wears the cutting tools 14 and 14', but also slows down the machining operation because the gap does not deionize rapidly enough. This phenomenon is more easily understood by referring to the FIGURE 2 graph. As there illustrated, positive half cycle pulses 52 of gap voltage, if permitted, allow the gap to break down so that a short pulse of positive or reverse current will flow from the anodic workpiece 12 to the cathodic cutting tools 14 and 14'. This reversal is reduced by installing rectifiers 54 and 54' across the gaps respectively between the workpiece 12 and the cutting tools 14 and 14'. The addition of rectifiers 54 and 54' causes rectifiers 46 and 46' to recover their normal high back resistance sooner, thereby preventing a reverse voltage from building up enough to produce a gap breakdown. The result is that the positive half cycle pulses are substantially eliminated and appear as the dotted lines 56 in the FIGURE 2 graph. The amplitude of these positive pulses are such that the gap does not break down, and therefore, the objectionable reverse flow of current flow does not occur; thus, the gap will rapidly deionize enabling the machining rate to be increased since a shorter period between the pulses is needed to effect the deionization.

As has been mentioned, the voltage across the gaps between the cutting tools 14 and 14' and the workpiece 12 will vary with the gap spacing. For instance, if the cutting tools 14 and 14' touch the workpiece 12, a short circuit occurs and the voltage will become substantially zero. On the other hand, if the gaps are lengthened beyond some predetermined maximum, gap voltage also will be a maximum of, e.g., 60 volts. The use of a voltage that reflects gap voltage offers an effective and practical way of controlling the gap spacing and may be accomplished by adding an impedance in series with both the input transformer secondary winding 36 and the output transformer primary winding 38 and by grounding the capacitor 48 at 58. The voltage for control purposes is then taken across the capacitor 48 and supplied to the gap spacing control 26. As will be explained in the description of the FIGURE 3 embodiment, this control voltage can be obtained by another transformer winding so as to furnish an inductive pickup. Preferably, the impedance is an inductive reactance, and therefore, an inductor 60 is employed. This is because an inductance inhibits the current surges that occasionally result, particularly when short circuits occur across the gap thereby protecting the source 30 from excessive current fluctuations. Also, this additional impedance together with that from the transformer 32 lessens the possibility of damage to the source equipment from excessive current.

It will now become apparent that the voltage across the capacitor 48 will vary in the same proportion as the gap voltage. To explain, it is first pointed out that the voltage across the input transformer secondary winding 36 will be equal to the sum of the voltage drops across the inductor 60 and the capacitor 48. For, during short circuit conditions, when gap voltage is minimum, and current maximum, the voltage drop across the inductor 60 will be maximum, whereas the drop across the capacitor 48 will be minimum, as is the voltage across the gap. Contrariwise, if gap voltage is maximum, current flow will be minimum and likewise the voltage drop across the inductor 60 will be a minimum. This means that the voltage across the capacitor 48 will be a maximum as will the gap voltage. Consequently, the voltage across the capacitor 48 can be utilized as a control voltage by the gap spacing control 26.

This control voltage in the control 26 portrayed in FIGURE 1 is supplied to a summing circuit 62 through a resistor 64 and a rectifier 66. The rectifier 66 is required since the control voltage across the capacitor 48 is alternating. At the summing circuit 62, the control voltage is compared with a reference voltage derived from a source 68 and applied to the summing circuit 62 through a potentiometer 70 and resistor 72. Preferably, the summed voltage is pulsating so as to keep the force motor and servo valve assembly 24 "alive" and relatively free from the influence of friction. This affords dither and renders the fluid pressure system far more responsive.

To explain the operation of the gap spacing control 26, actual voltage values will be used for exemplary purposes only. If the apparatus is cutting properly, and the gap spacing is in accord with that selected, it will be assumed that the gap voltage applied to the summing circuit 62 is a minus 40 volts. Since the gap conditions are those desired, the reference voltage must be a positive 40 volts so as to cancel the minus 40 volts. As a result, no signal will be supplied to the winding of the force motor and servo valve assembly 24 and accordingly no correction made in the gap spacing, but if a short circuit should occur between the workpiece 12 and one or both of the cutting tools 14 and 14', gap voltage will become a minimum, as will the control voltage furnished the summing circuit 62. Consequently, the positive reference voltage will dominate and a positive summed voltage will be applied to the winding of the force motor and servo valve assembly 24. Immediate correction will be made and the cutting tools 14 and 14' withdrawn sufficiently to clear the gap and interrupt the short. At the other extreme, if gap voltage becomes too great, the force motor and servo valve assembly 24 will be energized by a negative voltage and the cutting tools 14 and 14' will be moved closer to the workpiece 12.

Another feature of the FIGURE 1 apparatus is an interrupter shown schematically by the numeral 74. This interrupter 74 operates a switch 75 that is in series with the resistor 64 and the rectifier 66. Any suitable means may be utilized for opening and closing the switch 75; for instance, a cam 76 driven by a motor 78. The cam 76 has formed along the edge thereof a rise 79, which permits the end of switch 75 to move therein, so that with the switch 75 biased open, it will open and close several times a minute as the cam 76 is rotated by the motor 78. When the switch 75 opens, no negative voltage from the gap is supplied to the summing circuit 62, hence the dominating positive reference voltage will cause the cutting tools 14 and 14' to be withdrawn by the motor 19. This withdrawal is only for an instant and permits the gap to be cleared of any debris that might tend to produce a short circuit and additionally this produces a pumping action that tends to flush the gap of the debris.

To summarize the operation of the FIGURE 1 embodiment, the power source 30 is initially turned on and the cutting tools 14 and 14' move to the machining position, whereupon unidirectional pulses are applied to the gap and produce the discharges that erode stock from the workpiece 12 in a known manner. During the time when the pulse is on or during the On half cycle, energy is withdrawn from the tank circuit 50. Then, during the Off half cycle, this energy withdrawn is gradually replaced, due to the aforementioned "flywheel effect," thereby causing energy to be drawn more evenly from the source 30. Of course, energy is replaced in the tank circuit 50 during both the positive and negative halves of the cycle. As the workpiece 12 is machined, the gap will increase and the gap spacing control 26 will cause the proper gap reducing adjustments to be made so that the optimum gap is maintained. As can be now seen, assuming gap spacing is proper, the process or the gap conditions do not determine the number of pulses occurring across the gap, but these pulsations are controlled by the source 30.

As has been mentioned, additional cutting tools and workpieces can be used depending on the power available. Consequently, more of the potential capacity of the source can be effectively utilized. Additionally, the control permitted by the movement of one or both of the secondary windings 42 and 42' enables the operator to make further refinements in the operation. This can be done by coordinating the outputs from the secondaries 42 and 42' with the frequencies of the source, keeping in mind that higher frequencies with lower pulse amplitudes produce a fine finish but a slower machining rate, whereas low frequencies and higher amplitude pulses remove more metal with a rougher finish and at a faster rate.

As shown in FIGURE 3, a battery of machines 10 can be operated by a single source thus utilizing the potential capacity of a source to an even greater extent and permitting one operator to serve several machines. In this arrangement, like components have been assigned the same numerals as those in the FIGURE 1 embodiment. Also, the operation of each machine 10 is substantially the same as that of the apparatus in FIGURE 1.

Referring to FIGURE 3, energy is supplied by the high frequency source 30 through an input or isolating transformer 32 and then through a conductor 80 and a shield 82 to the output transformer 40. The shield 80 serves the several machines 10 that may be connected to the source, two being shown, although more are possible if the source capacity permits. As before, the energy is stored by tank circuit 50 and thereafter withdrawn through secondary winding 42 for producing the gap discharges. Also, the ratios of the transformers 32 and 40 can be made adjustable in any known way so as to insure that adequate voltage is always available should any unusual operating conditions occur.

There are some differences between these machines in FIGURE 3 and that in FIGURE 1. For example, a load resistor 84 may be employed instead of the rectifier 54. The load resistor 84 may be adequate where reverse currents do not present a problem. Too, instead of taking the control voltage from across the capacitor 48, a pickup winding 86 may be incorporated in the transformer 40 and arranged so as to sense gap voltage variations in a manner similar to the capacitor 48. In other words, as this voltage across capacitor 48 and primary winding 38 varies in the previously described manner, that across pickup winding 86 will also vary, enabling the resultant control voltage to be utilized for operating the gap spacing control 26 in the aforediscussed way.

The invention is to be limited only by the following claims:

1. In electrical stock removal apparatus, the combination of conductive tool and workpiece electrodes spaced apart so as to form a gap therebetween, an A.C. source of energy having a certain frequency, a parallel resonant circuit energized by and tuned to a frequency corresponding to the certain frequency of the source, and means coupling both the source and the parallel resonant circuit across the gap so as to effect stock removal from the workpiece electrode, the parallel resonant circuit being operative to store stock removing energy from the source during the entire cycle of the source.

2. In electrical stock removal apparatus, the combination of conductive tool and workpiece electrodes spaced apart so as to form a gap therebetween, an A.C. source of energy having a certain frequency, a parallel resonant circuit storing energy from the source, and a transformer coupling both the parallel resonant circuit and the source across the gap so as to effect stock removal from the workpiece electrode, the parallel resonant circuit being tuned to a frequency having a predetermined relationship to the source frequency so as to be operative both to provide an optimum power factor and stock removing energy from the source during the entire cycle of the source.

3. In electrical stock removal apparatus, the combination of conductive tool and workpiece electrodes spaced apart so as to form a gap therebetween, an energy source of alternating voltage having a certain frequency, a parallel resonant circuit tuned to the frequency of the source and operative to store stock removing energy from the source during the entire cycle of the source, a transformer coupling both the parallel resonant circuit and the source across the gap so as to effect stock removal from the workpiece electrode, and a rectifier in series with the transformer for changing the alternating voltage to a unidirectional voltage before applying to the gap so as to provide positive current flow from the workpiece electrode to the tool electrode and thereby effect stock removal from the workpiece electrode.

4. In electrical stock removal apparatus, the combination of conductive tool and workpiece electrodes spaced apart so as to form a gap therebetween, an A.C. source of energy having a certain number of cycles per a predetermined time interval, a parallel resonant circuit tuned to the frequency of the source and operative to store energy from the source, a transformer coupling both the parallel resonant circuit and the source across the gap so as to provide current flow between the workpiece electrode and the tool electrode thereby effecting stock removal from the workpiece electrode, the parallel resonant circuit being operative both to store stock removing energy during the entire cycle of the source and to provide an optimum power factor, and a unidirectional conductive device in parallel with the gap for inhibiting current flow across the gap in a reverse direction.

5. In electrical stock removal apparatus, the combination of conductive tool and workpiece electrodes spaced apart so as to form a gap therebetween, an A.C. source of energy having a certain frequency, a transformer so arranged as to have the primary winding thereof energized by the source and the secondary winding thereof connected across the gap, a tuning capacitor in parallel with the transformer primary winding so as to provide a parallel resonant circuit for storing energy from the source, the parallel resonant circuit being tuned to a frequency having a predetermined relationship to the frequency of the source so as to be operative to store stock removing energy during the entire cycle of the source, and impedance means in series with the parallel resonant circuit so as to inhibit current surges.

6. In electrical stock removal apparatus, the combination of conductive tool and workpiece electrodes spaced apart so as to form a gap therebetween, a cyclic energy source of alternating voltage, a transformer so arranged as to have the primary winding thereof energized by the source and the secondary winding thereof connected across the gap, a tuning capacitor in parallel with the transformer primary winding so as to provide a parallel resonant circuit for storing energy from the source, the parallel resonant circuit being tuned to the frequency of the source and operative to store stock removing energy during the entire cycle of the source, and a rectifier for changing the alternating voltage from the transformer secondary winding to a unidirectional voltage before applying to the gap so as to provide current flow between the workpiece electrode and the tool electrode and thereby effect stock removal from the workpiece electrode.

7. In electrical stock removal apparatus, the combination of conductive tool and workpiece electrodes spaced apart so as to form a gap therebetween, a cyclic energy source of alternating voltage, a transformer so arranged as to have the primary winding thereof energized by the source and the secondary winding thereof connected across the gap, a tuning capacitor in parallel with the transformer primary winding so as to provide a parallel resonant circuit tuned to the frequency of the source and operative to store stock removing energy from the source during the entire cycle of the source, an inductive reactance in series with the parallel resonant circuit so as to inhibit current surges, a rectifier for changing the alternating voltage from the transformer secondary winding to a unidirectional voltage before applying to the gap so as to provide current flow between the workpiece electrode and the tool electrode and thereby effect stock removal from the workpiece electrode, and a unidirectional control device in parallel with the gap for inhibiting current flow across the gap in a reverse direction.

8. In electrical stock removal apparatus, the combination of conductive tool and workpiece electrodes spaced apart so as to form a gap therebetween, a cyclic source of alternating voltage having a certain frequency, a parallel resonant circuit for storing energy from the source, input means transferring energy from the source to the circuit, and output means transferring energy from the circuit to the gap so as to effect stock removal from the workpiece electrode, the parallel resonant circuit being tuned to a frequency having a predetermined relationship to source frequency so as to be operative to store a stock removing energy during the entire cycle of the source.

9. In electrical stock removal apparatus, the combination of conductive tool and workpiece electrodes spaced apart so as to form a gap therebetween, a cyclic source of alternating voltage having a certain frequency, a parallel resonant circuit tuned to a frequency corresponding to the source frequency, a first transformer coupling the source to the parallel resonant circuit, and a second transformer coupling the parallel resonant circuit to the gap, the parallel resonant circuit being operative both to provide an optimum power factor and to store stock removing energy during the entire cycle of the source.

10. In electrical stock removal apparatus, the combination of conductive tool and workpiece electrodes spaced apart so as to form a gap therebetween, a cyclic source of alternating voltage, a parallel resonant circuit tuned to the frequency of the source, a first transformer coupling the source to the parallel resonant circuit, a second transformer coupling the parallel resonant circuit to the gap, the parallel resonant circuit being operative to store stock removing energy during the entire cycle of the source, impedance means between the first transformer and the parallel resonant circuit for inhibiting current surges, and a rectifier between the second transformer and the gap, the rectifier changing the alternating voltage from the second transformer to a unidirectional voltage before application to the gap so as to provide current flow between the workpiece electrode and the tool electrode and thereby effect stock removal from the workpiece.

11. In electrical stock removal apparatus, the combination of conductive tool and workpiece electrodes spaced apart so as to form a gap therebetween, a cyclic source of alternating voltage, a parallel resonant circuit tuned to the frequency of the source, a first transformer coupling the source to the parallel resonant circuit, a second transformer coupling the parallel resonant circuit to the gap, the parallel resonant circuit being operative both to provide an optimum power factor and to store stock removing energy during the entire cycle of the source, a rectifier between the second transformer and the gap, the rectifier changing the alternating voltage from the second transformer to a unidirectional voltage before application to the gap so as to provide current flow between the workpiece electrode and the tool electrode and thereby produce stock removal from the workpiece, and a unidirectional conductive device in parallel with the gap so as to inhibit current flow across the gap in a reverse direction.

12. In electrical stock removal apparatus, the combination of conductive tool and workpiece electrodes spaced apart so as to form a gap therebetween, a cyclic source of alternating voltage having a certain frequency, a first transformer having a primary winding energized by the source and a secondary winding, a second transformer having a primary winding connected to the first transformer secondary winding and a secondary winding connected across the gap, and a tuning capacitor in parallel with the second transformer primary winding so as to coact therewith and provide a parallel resonant circuit tuned to a frequency corresponding to source frequency for storing energy from the source, the parallel resonant circuit being operative to store stock removing energy during the entire cycle of the source.

13. In electrical stock removal apparatus, the combination of conductive tool and workpiece electrodes spaced apart so as to form a gap therebetween, a cyclic source of alternating voltage, a first transformer having a primary winding energized by the source and a secondary winding, a second transformer having a primary winding connected to the first transformer secondary winding and a secondary winding connected across the gap, a tuning capacitor in parallel with the second transformer primary winding so as to coact therewith and provide a parallel resonant circuit tuned to the frequency of the source for storing energy from the source, the parallel resonant circuit being operative to store stock removing energy during the entire cycle of the source, an inductive reactance in series with the parallel resonant circuit for inhibiting current surges, and a rectifier for changing the alternating voltage from the second transformer secondary winding to a unidirectional voltage before application to the gap so as to provide current flow between the workpiece electrode and the tool electrode and thereby produce stock removal from the workpiece.

14. In electrical stock removal apparatus, the combination of conductive tool and workpiece electrodes spaced apart so as to form a gap therebetween, a cyclic source of alternating voltage, a first transformer having a primary winding energized by the source and a secondary winding, a second transformer having a primary winding connected to the first transformer secondary winding and a secondary winding connected across the gap, a tuning capacitor in parallel with the second transformer primary winding so as to coact therewith and provide a parallel resonant circuit tuned to the frequency of the source for storing energy from the source, the parallel resonant circuit being operative both to provide an optimum power factor and to store stock removing energy during the entire cycle of the source, a rectifier for changing the alternating voltage from the second transformer secondary winding to a unidirectional voltage before application to the gap so as to provide current flow between the workpiece electrode and the tool electrode and thereby effect stock removal from the workpiece, and a unidirectional conductive device arranged in parallel with the gap so as to inhibit current flow across the gap in a reverse direction.

15. In combination; a single cyclic source of alternating voltage; and a series of electrical stock removal apparatus; each apparatus including conductive tool and workpiece electrodes spaced apart so as to form a gap therebetween, means storing stock removing energy from the source during the entire cycle of the source, and means transferring energy both from the energy storing means and the source to each gap so as to effect stock removal from the respective workpiece electrode.

16. In combination; a single cyclic source of alternating voltage having a certain frequency; and a series of electrical stock removal apparatus; each apparatus including conductive tool and workpiece electrodes spaced apart so as to form a gap therebetween, a parallel resonant circuit tuned to a frequency having a predetermined relationship to source frequency so as to store stock removing energy from the source during the entire cycle of the source, and means transferring energy from the energy storing means to each gap so as to effect stock removal from the respective workpiece electrode, the energy transferring means including means changing the alternating voltage to a unidirectional voltage before application to the gap.

17. In combination; a single cyclic source of alternating voltage having a certain frequency; and a series of electrical stock removal apparatus each operated by the single source; each apparatus including conductive tool and workpiece electrodes spaced apart so as to form a gap therebetween, a transformer having a primary winding energized by the source and a secondary winding connected across the gap between the electrodes, and a tuning capacitor in parallel with the primary winding so as to coact therewith and provide a parallel resonant circuit tuned to a frequency having a predetermined relation to frequency of the source so as to store stock removing energy from the source during the entire cycle of the source.

18. In combination; a single cyclic source of alternating voltage; and a series of electrical stock removal apparatus each operated by the single source, each apparatus including conductive tool and workpiece electrodes spaced apart so as to form a gap therebetween, a transformer having a primary winding energized by the source and a secondary winding connected across the gap between the electrodes, a tuning capacitor in parallel with the primary winding so as to coact therewith and provide a parallel resonant circut tuned to the frequency of the source for storing stock removing energy from the source during the entire cycle of the source, rectifier means for changing the alternating voltage induced in the secondary winding to a unidirectional voltage before application to the gap so as to provide current flow between the workpiece electrode and the tool electrode and thereby produce stock removal from the workpiece electrode, and impedance means in series with the parallel resonant circuit.

19. In combination; a single cyclic source of alternating voltage having a certain frequency; and a series of electrical stock removal apparatus each operated by the single source; each apparatus including conductive tool and workpiece electrodes spaced apart so as to form a gap therebetween, a transformer having a primary winding energized by the source and a secondary winding connected across the gap between the electrodes, a tuning capacitor in parallel with the primary winding so as to coact therewith and provide a parallel resonant circuit tuned to the frequency of the source for storing stock removing energy from the source during the entire cycle of the source and also for providing an optimum power factor, a rectifier means for changing the alternating voltage induced in the secondary winding to a unidirectional voltage before application to the gap so as to provide current flow between the workpiece electrode and the tool electrode and thereby produce stock removal from the workpiece, and a unidirectional conductive device arranged in parallel with the gap so as to inhibit current flow across the gap in a reverse direction.

20. In combination; a single cyclic source of alternating voltage having a certain frequency; and a series of electrical stock removal apparatus; each apparatus including conductive tool and workpiece electrodes spaced apart so as to form a gap therebetween, means storing stock removing energy from the source, the energy storing means including a parallel resonant circuit tuned to a frequency having a predetermined relation to the frequency of the source, means transferring energy from both the source and the parallel resonant circuit to each gap so as to effect stock removal from the workpiece electrode,

11 means maneuvering the electrodes relative to each other so as to maintain a predetermined gap between the electrodes.

21. In combination; a single source of alternating voltage; and a series of electrical stock removal apparatus; each apparatus including conductive tool and workpiece electrodes spaced apart so as to form a gap therebetween, means storing energy from the source, means transferring energy from the energy storing means to each gap so as to effect stock removal from the respective workpiece electrode, means maneuvering the electrodes relative to each other, means controlling the maneuvering means in response to a condition of the gap so as to maintain a predetermined gap between the electrodes, and means interrupting stock removal of one apparatus periodically by causing the maneuvering means to separate the electrodes.

22. In combination; a single cyclic source of alternating voltage having a certain frequency; and a series of electrical stock removal apparatus; each apparatus including conductive tool and workpiece electrodes spaced apart so as to form a gap therebetween, means storing energy from the source and including a parallel resonant circuit tuned to a frequency having a predetermined relationship to the frequency of the source so as to be operative to store stock removing energy during the entire cycle of the source, means transferring energy both from the source and the parallel resonant circuit to each gap so as to effect stock removal from the respective workpiece electrode, means maneuvering the electrodes relative to each other, means controlling the maneuvering means so as to maintain a predetermined gap between the electrodes, impedance means in series with the source and the parallel resonant circuit for preventing current surges and also for causing the parallel resonant circuit to reflect voltage changes across the gaps.

23. In combination; a single cyclic source of alternating voltage having a certain frequency; input means energized by the source; and a series of electrical stock removal apparatus operated by the single source; each apparatus including conductive tool and workpiece electrodes spaced apart so as to form a gap therebetween, means storing stock removing energy transferred thereto from the source by the input means, the energy storing means including a parallel resonant circuit tuned to a frequency having a predetermined relation to the frequency of the source so as to be operative to store energy during the entire cycle of the source, and output means transferring energy from the energy storing means to the gap so as to effect stock removal from the workpiece electrode.

24. In combination; a single cyclic source of alternating voltage; an isolating transformer having a primary winding connected to the source and a secondary winding; and a series of electrical stock removal apparatus each operated by the single source; each apparatus including conductive tool and workpiece electrodes spaced apart so as to form a gap therebetween, a transformer having a primary winding connected to the isolating transformer secondary winding and a secondary winding connected across the gap so as to supply energy for removing stock from the workpiece electrode, a tuning capacitor in parallel with the apparatus transformer primary winding so as to coact therewith and provide a parallel resonant circuit tuned to the frequency of the source for storing stock removing energy derived from the source during the entire cycle of the source.

25. In combination; a single source of alternating voltage; an isolating transformer having a primary winding connected to the source and a secondary winding; and a series of electrical stock removal apparatus each operted by the single source; each apparatus including conductive tool and workpiece electrodes spaced apart so as to form a gap therebetween, a transformer having a primary winding connected to the isolating transformer secondary winding and a secondary winding connected across the gap, a tuning capacitor in parallel with the apparatus transformer primary winding so as to coact therewith and provide a parallel resonant circuit for storing energy derived from the source, a rectifier for changing the alternating voltage induced in the transformer secondary winding to a unidirectional voltage before application to the gap so as to provide a current flow between the workpiece electrode and the tool electrode and thereby effect stock removal from the workpiece electrode, impedance means in series with the parallel resonant circuit so as to cause voltage variations across the parallel resonant circuit to correspond to gap voltage variations, means maneuvering the electrodes relative to each other, and means responsive to the voltage across the parallel resonant circuit for controlling the maneuvering means so as to cause a predetermined gap to be maintained between the electrodes.

26. In combination; a single source of alternating voltage; an isolating transformer having a primary winding connected to the source and a secondary winding; a series of electrical stock removal apparatus each operated by the single source; each apparatus including conductive tool and workpiece electrodes spaced apart so as to form a gap therebetween, a transformer having a primary winding connected to the isolating transformer secondary winding and a secondary winding connected across the gap, a tuning capacitor in parallel with the apparatus transformer primary winding so as to coact therewith and provide a parallel resonant circuit for storing energy derived from the source, a rectifier for changing the alternating voltage induced in the apparatus transformer secondary winding to a unidirectional voltage before application with the gap so as to provide a current flow between the workpiece electrode and the tool electrode and thereby effect stock removal from the workpiece electrode, inductive reactance means in series with the parallel resonant circuit so as to cause voltage variations across the parallel resonant circuit to correspond to gap voltage variations and also to limit current surges, means maneuvering the electrodes relative to each other, and means controlling the maneuvering means including an inductive pickup coupling the controlling means to the parallel resonant circuit so that the controlling means will cause the maneuvering means to be operative in response to gap voltage and thereby maintain a predetermined gap between the electrodes, said control means including an inductive pickup responsive to voltage changes across the parallel resonant circuit.

27. In electrical stock removal apparatus, the combination of conductive tool and workpiece electrodes spaced apart so as to form a gap therebetween, a cyclic source of alternating voltage having a certain frequency, means storing stock removing energy from the source, the energy storing means including a parallel resonant circuit tuned to a frequency having a predetermined relation to the frequency of the source so as to be operative to store energy during the entire cycle of the source, means transferring energy from the energy storing means to the gap so as to effect stock removal from the workpiece electrode, impedance means between the source and the energy storing means, and means maneuvering the electrodes relative to each other.

28. In electrical stock removal apparatus, the combination of conductive tool and workpiece electrodes spaced apart so as to form a gap therebetween, a cyclic source of alternating voltage having a certain frequency, means storing stock removing energy from the source, the energy storing means including a parallel resonant circuit tuned to a frequency having a predetermined relationship to the frequency of the source so as to be operative to store energy during the entire cycle of the source, means transferring energy from the energy storing means to the gap so as to effect stock removal from the workpiece electrode, impedance means in series with the energy storing means, means maneuvering the electrodes relative to each other, means controlling the maneuvering means, and means coupling the controlling means to the energy storing means so that the controlling means will cause the maneuvering means to be operative in response to gap voltage and thereby maintain a predetermined gap between the electrodes.

29. In electrical stock removal apparatus, the combination of conductive tool and workpiece electrodes spaced apart so as to form a gap therebetween, a cyclic source of alternating voltage, means storing stock removing energy from the source during the entire cycle of the source, means transferring energy from the energy storing means to the gap so as to provide current flow between the workpiece electrode and the tool electrode thereby effecting stock removal from the workpiece electrode, means varying the output of the energy transferring means, and means maneuvering the electrodes relative to each other.

30. In electrical stock removal apparatus, the combination of conductive tool and workpiece electrodes spaced apart so as to form a gap therebetween, a cyclic source of alternating voltage having a certain frequency, means storing energy from the source, the energy storing means including a parallel resonant circuit tuned to a frequency having a predetermined relationship to source frequency so as to be operative to store stock removing energy during the entire cycle of the source, means transferring energy from the energy storing means to the gap so as to effect stock removal from the workpiece electrode, impedance means between the source and the energy storing means, means maneuvering the electrodes relative to each other, and means controlling the maneuvering means in response to the voltage variations across the energy storing means so as to maintain a predetermined gap between the electrodes.

31. In electrical stock removal apparatus, the combination of conductive tool and workpiece electrodes spaced apart so as to form a gap therebetween, a source of alternating voltage, means storing energy from the source, means transferring energy from the energy storing means to the gap so as to effect stock removal from the workpiece electrode, impedance means in series with the energy storing means so as to cause voltage variations across the energy storing means to correspond to gap voltage variations, means maneuvering the electrodes relative to each other, means controlling the maneuvering means in response to gap voltage so as to maintain a predetermined gap between the electrodes, and means interrupting stock removal periodically by causing the maneuvering means to separate the electrodes.

32. In electrical stock removal apparatus, the combination of conductive tool and workpiece electrodes spaced apart so as to form a gap therebetween, a cyclic source of alternating voltage, means storing stock removing energy from the source and including a parallel resonant circuit tuned to the frequency of the source and operative to store stock removing energy during the entire cycle of the source, means transferring energy from the energy storing means to the gap so as to provide current flow between the workpiece electrode and the tool electrode thereby effecting stock removal from the workpiece electrode, rectifier means changing the alternating voltage to a unidirectional voltage before application to the gap, unidirectional conductive means inhibiting current flow across the gap in a reverse direction, means maneuvering the electrodes relative to each other, and means controlling the maneuvering means in response to gap voltage so as to maintain a predetermined gap therebetween.

33. In electrical stock removal apparatus, the combination of conductive tool and workpiece electrodes spaced apart so as to form a gap therebetween, a source of alternating voltage, a transformer having the primary winding thereof energized by the source and the secondary winding thereof connected across the gap, a tuning capacitor in parallel with the primary winding so as to coact therewith and provide a parallel resonant circuit for storing source energy, impedance means in series with the parallel resonant circuit so as to cause the voltage variations across the parallel resonant circuit to correspond to gap voltage variations, means maneuvering the electrodes relative to each other, and means controlling the maneuvering means in response to voltage variations across the parallel resonant circuit so as to maintain a predetermined gap between the electrodes.

34. In electrical stock removal apparatus, the combination of conductive tool and workpiece electrodes spaced apart so as to form a gap therebetween, a source of alternating voltage, a transformer having the primary winding thereof energized by the source and the secondary winding thereof connected across the gap, a tuning capacitor in parallel with the primary winding so as to coact therewith and provide a parallel resonant circuit for storing source energy, impedance means in series with the parallel resonant circuit so as to cause the voltage variations across the parallel resonant circuit to correspond to gap voltage variations, means maneuvering the electrodes relative to each other, means controlling the maneuvering means in response to voltage variations across the parallel resonant circuit so as to maintain a predetermined gap between the electrodes, and means interrupting stock removal periodically by causing the maneuvering means to separate the electrodes.

35. In electrical stock removal apparatus, the combination of conductive tool and workpiece electrodes spaced apart so as to form a gap therebetween, a cyclic source of alternating voltage, means storing stock removing energy from the source during the entire cycle of the source, input means transferring energy from the source, output means transferring energy from the energy storing means to the gap so as to effect stock removal from the workpiece electrode, impedance means between the input means and the energy storing means, means maneuvering the electrodes relative to each other, and means controlling the maneuvering means in response to gap voltage variations across the energy storing means so as to maintain a predetermined gap between the electrodes.

36. In electrical stock removal apparatus, the combination of conductive tool and workpiece electrodes spaced apart so as to form a gap therebetween, a source of alternating voltage, a first transformer having a primary winding energized by the source and a secondary winding, a second transformer having a primary winding connected to the first transformer secondary winding and a secondary winding connected across the gap, a tuning capacitor in parallel with the second transformer primary winding so as to coact therewith and provide a parallel resonant circuit for storing energy from the source, impedance means arranged between the first transformer secondary winding and the second transformer primary winding so as to cause the voltage variations across the parallel resonant circuit to correspond to gap voltage variations, means maneuvering the electrodes relative to each other, and means controlling the maneuvering means in response to voltage variations across the parallel resonant circuit so as to maintain a predetermined gap between the electrodes.

37. In electrical stock removal apparatus, the combination of conductive tool and workpiece electrodes spaced apart so as to form a gap therebetween, a source of alternating voltage, a first transformer having a primary winding energized by the source and a secondary winding, a second transformer having a primary winding connected to the first transformer secondary winding and a secondary winding connected across the gap, a tuning capacitor in parallel with the second transformer primary winding so as to coact therewith and provide a parallel resonant circuit for storing energy from the source, impedance means in series with the first transformer secondary winding and the second transformer primary winding so as to cause voltage variations across the parallel resonant circuit to correspond to gap voltage variations, means maneuvering electrodes relative to each other, means controlling the maneuvering means in response to voltage variations across the parallel resonant circuit so as to maintain a predetermined gap between the electrodes, and means interrupting stock removal periodically by causing the maneuvering means to separate the electrodes.

38. In electrical stock removal apparatus, the combination of conductive tool and workpiece electrodes spaced apart so as to form a gap therebetween, a source of alternating voltage, a first transformer having a primary winding energized by the source and a secondary winding, a second transformer having a primary winding connected to the first transformer secondary winding and a secondary winding connected across the gap, a tuning capacitor in parallel with the second transformer primary winding so as to coact therewith and provide a parallel resonant circuit for storing source energy, an inductive reactance in series with the first transformer secondary winding and the parallel resonant circuit so as to limit current surges and also so as to cause the voltage variations across the parallel resonant circuit to correspond to gap voltage variations, an inductive pickup sensing voltage variations across the parallel resonant circuit, means maneuvering the electrodes relative to each other, and means controlling the maneuvering means in response to voltage variations across the inductive pickup so as to cause a predetermined gap between the electrodes to be maintained.

39. In electrical stock removal apparatus, the combination of a series of conductive tool electrodes, a conductive workpiece electrode spaced from the series of tool electrodes so as to form a gap therebetween, a cyclic source of alternating voltage, means storing stock removing energy from the source during the entire cycle of the source, and plural output means transferring energy from the energy storing means to the respective gaps between the series of tool electrodes and the workpiece electrode so as to effect stock removal from the workpiece electrode.

40. In electrical stock removal apparatus, the combination of a series of conductive tool electrodes, a conductive workpiece electrode spaced from the series of tool electrodes so as to form a gap therebetween, a cyclic source of alternating voltage having a certain frequency, means storing stock removing energy from the source and including a parallel resonant circuit tuned to a frequency having a predetermined relationship to the frequency of the source so as to be operative during the entire cycle of the source, and plural output means transferring energy from both the energy storing means and the source to the respective gaps between the series of tool electrodes and the workpiece electrode so as to effect stock removal from the workpiece electrode, one of the plural output means including control means varying the output thereof.

41. In electrical stock removal apparatus, the combination of a series of conductive tool electrodes, a conductive workpiece electrode spaced from the series of tool electrodes so as to form a gap therebetween, a source of alternating voltage, means storing energy from the source, plural energy transferring means coupling the energy storing means across the respective gaps so as to provide current flow between the workpiece electrode and the associated tool electrode thereby effecting stock removal from the workpiece electrode, rectifier means changing the alternating voltage supplied to one of the plural energy transferring means to a unidirectional voltage before application to the associated gap, and unidirectional conductive means inhibiting current flow across one of the gaps in a reverse direction.

42. In electrical stock removal apparatus, the combination of a series of conductive tool electrodes, a conductive workpiece electrode spaced from the series of tool electrodes so as to form a gap therebetween, a source of alternating voltage, means storing energy from the source, and plural energy transferring means coupling the energy storing means across respective gaps so as to provide current flow between the workpiece electrode and the associated tool electrode thereby effecting stock removal from the workpiece electrode, each of the plural energy transferring means including rectifier means changing the alternating voltage to a unidirectional voltage before application to its associated gap and unidirectional conductive means inhibiting current flow across its associated gap in a reverse direction, one of the energy transferring means having control means varying the output thereof.

43. In electrical stock removal apparatus, the combination of a series of conductive tool electrodes, a conductive workpiece spaced from the series of tool electrodes so as to form a gap therebetween, a cycle source of alternating voltage having a certain frequency, a parallel resonant circuit tuned to a frequency having a predetermined relation to source frequency so as to store stock removing energy from the source during the entire cycle of the source, impedance means between the source and the parallel resonant circuit for inhibiting current surges, and a plurality of transformers coupling the parallel resonant circuit across each of the gaps so as to effect stock removal from the workpiece electrode.

44. In electrical stock removal apparatus, the combination of a series of conductive tool electrodes, a conductive workpiece spaced from the series of tool electrodes so as to form a gap therebetween, a cyclic source of alternating voltage having a certain frequency, a parallel resonant circuit tuned to a frequency having a predetermined relation to source frequency so as to store stock removing energy from the source during the entire cycle of the workpiece, and a plurality of transformers coupling the parallel resonant circuit across each of the gaps so as to effect stock removal from the workpiece electrode, one of the plurality of transformers including control means varying the output thereof.

45. In electrical stock removal apparatus, the combination of a series of conductive tool electrodes, a conductive workpiece spaced from the series of tool electrodes so as to form a gap therebetween, a source of alternating voltage, a parallel resonant circuit storing energy from the source, a plurality of transformers coupling the parallel resonant circuit across the respective gaps so as to provide current flow between the workpiece electrode and the associated tool electrode thereby effecting stock removal from the workpiece electrode, rectifier means changing the alternating voltage supplied to one of the plurality of transformers to a pulsating unidirectional voltage before application to the associated gap, and unidirectional conductive means inhibiting current flow across one of the gaps in a reverse direction.

46. In electrical stock removal apparatus, the combination of a series of conductive tool electrodes, a conductive workpiece electrode spaced from the series of tool electrodes so as to form a gap therebetween, a cyclic source of alternating voltage, a first transformer having a primary winding energized by the source and a secondary winding, a second transformer having a primary winding connected to the first transformer secondary winding and plural secondary windings connected across each gap between the respective tool electrode and the workpiece electrode so as to cause stock to be removed from the workpiece electrode when the plural secondary windings are energized, and a tuning capacitor in parallel with the second transformer primary winding so as to provide a parallel resonant circuit tuned to the frequency of the source for storing stock removing energy from the source during the entire cycle of the source.

47. In electrical stock removal apparatus, the combination of a series of conductive tool electrodes, a conductive workpiece electrode spaced from the series of tool electrodes so as to form a gap therebetween, a cyclic source of alternating voltage, a first transformer having a primary winding energized by the source and a secondary winding, a second transformer having a primary winding connected to the first transformer secondary winding and plural secondary windings connected across each gap between the respective tool electrodes and the workpiece electrode so as to cause stock to be removed from the workpiece electrode when the plural secondary windings are energized, and a tuning capacitor in parallel with the second transformer primary winding so as to provide a parallel resonant circuit tuned to the frequency of the source for storing stock removing energy from the source during the entire cycle of the source, one of the second transformer secondary windings being so arranged as to provide a selectively variable voltage across its associated gap.

48. In electrical stock removal apparatus, the combination of a series of conductive tool electrodes, a conductive workpiece electrode spaced from the series of tool electrodes so as to form a gap therebetween, a cyclic source of alternating voltage, a first transformer having a primary winding energized by the source and a secondary winding, a second transformer having a primary winding connected to the first transformer secondary winding and plural secondary windings connected across the respective tool electrodes in the workpiece electrode so as to cause stock to be removed from the workpiece electrode when the plural secondary windings are energized, a tuning capacitor in parallel with the second transformer primary winding so as to provide a parallel resonant circuit tuned to the frequency of the source for storing stock removing energy from the source during the entire cycle of the source, an inductive reactance in series with the parallel resonant circuit for inhibiting current surges, each of the second transformer secondary windings having a rectifier in series therewith for changing the alternating voltage to a unidirectional voltage before applying to the gap so as to provide current flow between the workpiece electrode and the tool electrode and thereby effect stock removal from the workpiece electrode.

49. In electrical stock removal apparatus, the combination of a series of conductive tool electrodes, a conductive workpiece electrode spaced from the series of tool electrodes so as to form a gap therebetween, a source of alternating voltage, a first transformer having a primary winding energized by the source and a secondary winding, a second transformer having a primary winding connected to the first transformer secondary winding, plural secondary windings connected across the respective tool electrodes in the workpiece so as to effect stock removal from the workpiece electrode when the plural secondary windings are energized, and a tuning capacitor in parallel with the second transformer primary winding so as to provide a parallel resonant circuit for storing energy from the source, each of the second transformer secondary windings having a unidirectional control device in parallel therewith for inhibiting current flow across its associated gap in a reverse direction.

References Cited by the Examiner
UNITED STATES PATENTS

| | | | |
|---|---|---|---|
| 1,506,320 | 8/24 | Northrup | 315—232 |
| 2,389,637 | 11/45 | Ruben | 315—227 |
| 2,438,941 | 4/48 | Peters et al. | 219—69 |
| 2,443,077 | 6/48 | Martin | 219—116 |
| 2,628,330 | 2/53 | Williams. | |
| 2,773,168 | 12/56 | Williams. | |
| 2,779,857 | 1/57 | Mironoff. | |
| 2,783,411 | 2/57 | Matulaitis | 219—69 |
| 2,785,279 | 3/57 | Williams. | |
| 2,794,109 | 5/57 | Martin. | |
| 2,798,934 | 7/57 | Bruma. | |
| 2,818,491 | 12/57 | Matulaitis. | |
| 2,871,410 | 1/59 | Matulaitis. | |
| 2,895,080 | 7/59 | Branker. | |
| 2,951,142 | 8/60 | Ullmann | 219—69 |
| 3,054,931 | 9/62 | Inoue | 219—69 |

RICHARD M. WOOD, *Primary Examiner.*

RALPH G. NILSON, JOSEPH V. TRUHE, Sr., ANTHONY BARTIS, *Examiners.*

UNITED STATES PATENT OFFICE
CERTIFICATE OF CORRECTION

Patent No. 3,213,257                      October 19, 1965

Millard A. Ferguson

It is hereby certified that error appears in the above numbered patent requiring correction and that the said Letters Patent should read as corrected below.

Column 3, line 36, for "an" read -- and --; line 43, for "freqeuncy" read -- frequency --; column 10, line 35, for "circut" read -- circuit --; column 16, line 14, for "cycle" read -- cyclic --.

Signed and sealed this 31st day of May 1966.

(SEAL)
Attest:

ERNEST W. SWIDER                         EDWARD J. BRENNEl
Attesting Officer                           Commissioner of Patents